United States Patent [19]

Ostenso et al.

[11] 4,199,799

[45] Apr. 22, 1980

[54] SUPERVISORY CIRCUIT FOR REDUNDANT CHANNEL CONTROL SYSTEMS

[75] Inventors: Allen L. Ostenso; Charles B. Johnson, both of San Jose, Calif.

[73] Assignee: General Electric Company, San Jose, Calif.

[21] Appl. No.: 889,625

[22] Filed: Mar. 24, 1978

[51] Int. Cl.² .............................................. H02H 3/26
[52] U.S. Cl. ....................................... 361/78; 361/86;
361/1; 307/204; 307/219; 318/564; 328/117;
328/147
[58] Field of Search ................. 361/78, 86, 87, 1, 191;
307/204, 200 A, 219, 115; 328/147, 137, 154,
158, 117; 364/119; 318/563, 564

[56] References Cited

U.S. PATENT DOCUMENTS

| | | | |
|---|---|---|---|
| 3,689,802 | 9/1972 | Waldmann | 307/204 |
| 3,800,164 | 3/1974 | Miller | 307/204 |
| 3,979,720 | 9/1976 | Laas et al. | 307/219 X |
| 4,105,900 | 8/1978 | Martin et al. | 307/219 |

Primary Examiner—Patrick R. Salce
Attorney, Agent, or Firm—Ivor J. James, Jr.; Samuel E. Turner; Sam E. Laub

[57] ABSTRACT

The invention is directed to a supervisory circuit for a control system of the type having a plurality of redundant input channels and a single output channel. More specifically, the invention is directed to a supervisory circuit for a two-channel redundant control system that provides reliability approaching that of a three-channel system. The supervisory circuit operates on the assumption that the majority of control circuit failures are catastrophic. The supervisory circuit includes a channel select circuit that receives the outputs of both of the identical control circuits and determines the faulted channel. Determination of the faulted channel is accomplished by a two-step comparison. In the first step, the outputs of both channels are compared with a previously stored output, or average of previous outputs. In the second step, signals representative of the absolute difference between each channel output and the stored output are compared. The polarity of the output of the second comparison determines the faulted channel. Normally, a manual channel select switch determines which channel is used as the output of the control system. In one embodiment of the invention an independent trip circuit determines when a fault has occurred in one of the two channels and disables the manual channel select switch in favor of the channel selection made by the channel select circuit. In another embodiment of the invention, the output of the channel select circuit is directly used to determine whether a fault has occurred and when the manual channel select switch should be disabled in favor of the channel select circuit.

8 Claims, 2 Drawing Figures

SUPERVISORY CIRCUIT FOR REDUNDANT CHANNEL CONTROL SYSTEMS

BACKGROUND

The invention is directed to a supervisory circuit for improving the reliability of redundant channel control systems. Such control systems are used, for example, in the control of nuclear reactors. The present invention is particularly suited for use in nuclear reactor control systems, but it may be utilized with any other control systems where high reliability and availability are desired.

In general, in the prior art, the reliability of a redundant channel control system can only be improved greatly by using three identical channels in parallel. A two-channel system with a simple gating mechanism between them typically does not have better reliability than a single-channel system, and the cost of additional redundant channels is often prohibitive.

Supervisory circuits for improving the reliability of redundant channel control systems are known in the prior art. The major disadvantage with most of these prior art circuits is that a failure in one of the control channels results in a fluctuation of the overall gain of the system. In numerous applications, this change in gain is not tolerable and the system cannot be used. Thus, often it is preferable that the supervisory cicuit operate out of the main path of current flow with only switches operating between the outputs of the redundant channel control system.

One prior art redundant channel supervisory circuit which operates in this manner is described in U.S. Pat. No. 3,800,164 to Miller. According to Miller, the two channels are connected through a circuit designated as the largest value selector to a summing network which provides a single output. The largest value selector utilizes two absolute magnitude detectors one of which is connected to each of the channel outputs. Two field effect transistor switches are used, one connected to each channel output. The absolute magnitude detectors measure the absolute magnitude of the output of each channel. The absolute magnitudes of the outputs of each channel are subtracted and the sign of the difference obtained is utilized to turn on one or the other of the two switches. The supervisory circuit of the Miller patent operates on the assumption that a channel failure will always result in a signal of increasing absolute amplitude. Thus, the largest value selector passes the signal having the smallest absolute amplitude. An obvious disadvantage of the supervisory circuit revealed by Miller is that it will choose the faulted rather than the unfaulted channel in a case where the faulted channel exhibits a decrease in absolute amplitude.

SUMMARY

It is an object of the invention to provide a circuit for supervising redundant two-channel control systems that provides reliability approaching that of a redundant three-channel system.

It is another object of the invention to provide a supervisory circuit for a redundant two-channel control system in which a fault in one of the supervisory channels does not affect the output of the control system.

It is another object of the invention to provide a supervisory circuit for a redundant two-channel control system of the type having only switches operating between redundant channel outputs and which is capable of detecting faulted channels exhibiting both an increase and decrease in output amplitude.

These and other objects of the invention are accomplished by providing a redundant channel control system supervisory circuit that operates on the assumption that the majority of control circuit failures are catastrophic. A catastrophic failure is indicated by a significant change in output over a relatively short period of time. The supervisory circuit includes a channel select circuit that receives inputs from both of the identical channels of the control system and determines the faulted channel. The selection is accomplished by a two-step comparison. In the first step, the outputs of both channels are compared with a previously stored output, or average of previous outputs. In this first comparison, the stored output is subtracted from each channel's output to provide first and second outputs equal to the differences between channel outputs and the stored output. In the second comparison, the absolute values of the outputs of the first comparison are subtracted. The polarity of the output of the second comparison indicates the faulted channel.

Normally, a manual channel select switch determines which channel is used as the output of the system. In one embodiment of the invention, an independent fault detection circuit determines when a fault has occurred in one of the channels by determining the absolute difference between the two channels. When the absolute difference exceeds a predetermined value, the fault detection circuit disables the manual channel select switch in favor of a channel selection circuit. In another embodiment of the invention, the absolute value of the output of the channel select circuit is directly used to determine whether a fault has occurred and when the manual channel select switch should be disabled in favor of the channel select circuit.

DRAWING

DESCRIPTION

Figure 1:
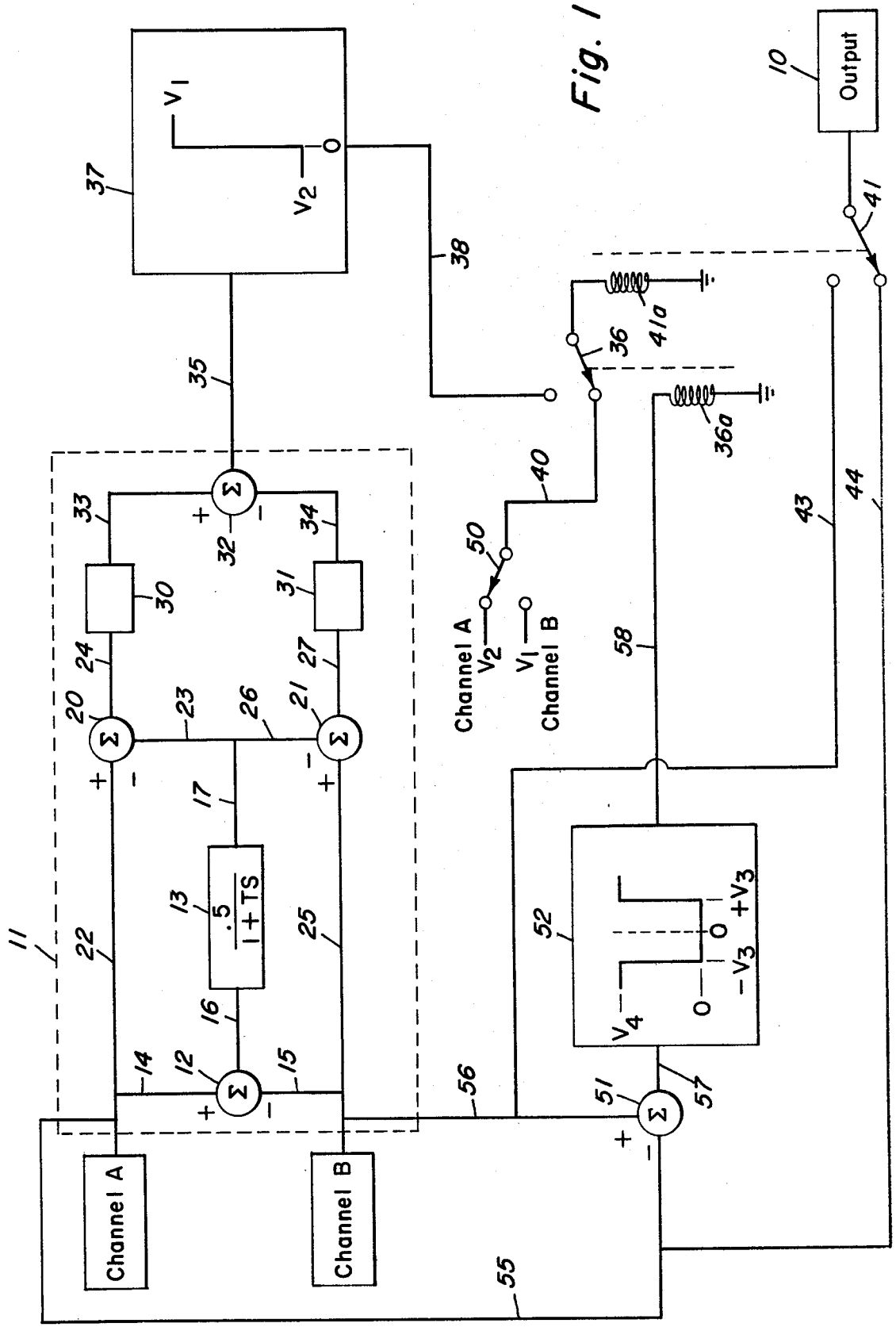
FIG. 1 is a schematic representation of one embodiment of the invention.

Referring to FIG. 1, a supervisory circuit for a redundant two-channel control system is illustrated in block diagram form. The supervisory circuit monitors the outputs of two redundant channels A and B. The supervisory circuit monitors these two channels and in the case of a fault in one of the channels connects the unfaulted channel to the output channel 10. The supervisory circuit operates on the assumption that the majority of control circuit failures are catastrophic, a catastrophic failure being defined as a failure causing a significant increase or decrease in output over a relatively short period of time.

The supervisory circuit includes a channel select circuit that is enclosed in the dotted lines 11. The channel select circuit receives the outputs of both of the redundant control channels A and B and determines the faulted channel, if any. The determination of the faulted channel is accomplished by a two-step comparison. In the first step, the outputs of channels A and B are compared with a delayed average of the outputs. The channel select circuit 11 includes means for forming a time delayed average comprising a first summer 12 and a time delay and averaging circuit 13. The summer 12 is connected to receive an input from each of the channels A and B through lines 14 and 15, respectively. The summer 12 produces an output on line 16 equal to the sum of the outputs of channels A and B. The time delay and averaging circuit 13 receives the output of the summer 12 on line 16 and the circuit 13 has a gain of 0.5 with a predetermined time delay. Thus, the output of the circuit 13 on line 17 is an average of the inputs of channels A and B with a predetermined time delay. The time delay can be provided by a simple RC circuit, or, in digital circuits, by storing N digital values and recalling the desired value at each clock pulse. In the legend indicated at 13 in FIG. 1, T is the time constant of the RC circuit, for example, and S is the LaPlacian operator.

A first comparing means comprising second and third summers 20 and 21, respectively, is connected to receive outputs of channels A and B, respectively, and the output of the time delay and averaging circuit 13. The second summer 20 receives the output of channel A on line 22 and the output of the time delay circuit 13 on line 23. The summer 20 produces a first output from the first comparing means on line 24 that is equal to the output of channel A minus the output of the time delay and averaging circuit 13. The summer 21 is connected to receive the output of channel B on line 25 and the output of the time delay and averaging circuit 13 on line 26. The summer 21 produces a second output from the first comparing means on line 27 that is equal to the output of channel B minus the output of the time delay and averaging circuit 13. If neither channel is faulted signals on lines 24 and 27 are equal to each other. But, if for example channel A is faulted, that is the signal on lead 22 is too high or too low, the absolute value of the signal on line 24 will be greater than the absolute value of the signal on line 27.

In the second step of the two-step comparison, a second comparing means is employed. This second comparing means comprises first and second absolute value generators 30 and 31, respectively, and a fourth summer 32 connected to receive the absolute value of the first and second outputs of the first comparing means. The first and second absolute value generators 30 and 31 are connected to receive the first and second outputs of the first comparing means on lines 24 and 27 respectively. The outputs of the first and second absolute value generators 30 and 31 are supplied to the fourth summer 32 on lines 33 and 34, respectively. The output of fourth summer 32 is equal to the output of the absolute value generator 30 minus the output of the absolute value generator 31.

The output of the fourth summer 32 appears on line 35 and comprises the output of the channel select circuit 11. A zero output on line 35 indicates that the signals of channels A and B are identical and neither channel is faulted. A voltage on line 35 indicates a faulted channel. The polarity of the voltage indicates which channel is faulted. A positive voltage on line 35 indicates a fault in channel A. A negative voltage on line 35 indicates a fault in channel B.

The output of the channel select circuit on line 35 is connected to a trigger circuit 37 which in turn is connected, through line 38 and switch 36, to a first switching means comprising a relay-operated bistable switch 41. The trigger circuit 37 provides an output on line 38 which depends on the polarity of the output of the second comparing means supplied to the trigger circuit on line 35. If the output of the second comparison means on line 35 is positive, indicating a fault in channel A, the output of the trigger circuit 37 is $V_1$. If the voltage on line 35 is negative, indicating a fault in channel B, the output of trigger circuit 37 is $V_2$. The switch 41 is connected to receive the outputs of channels A and B through lines 43 and 44, respectively. The switch 41 is operable to connect either of the channels A or B to the output channel 10 according to the output of the trigger circuit or a manual select switch 50. The switch 41 connects channel A to the output channel 10 if a voltage of magnitude $V_2$ is applied to relay 41a. A voltage of magnitude $V_1$ energizes the relay 41a of switch 41 to connect channel B to the output channel 10.

In the embodiment of the invention illustrated in FIG. 1 an independent trip circuit is provided to detect when a fault has occurred in one of the two channels A and B and to turn the channel over to the channel select circuit 11 when a fault is detected. Normally, the manual channel select switch 50 determines which channel is used as the output of the system. However, in the embodiment of FIG. 1, when a fault occurs, the independent fault detection circuit comprising a third comparing means is provided to disable the manual channel select switch 50 in favor of the channel selection made by the channel select circuit 11.

The third comparing means comprises a fifth summer 51, a deadband circuit 52 and a second relay-operated switch 36. The summer 51 is connected to receive the outputs of both channels A and B on lines 55 and 56, respectively. The summer 51 provides an output on line 57 equal to the difference between the inputs of channels A and B. The deadband circuit 52 receives the output of summer 51 on line 57. The switch 36 is connected to receive the output of the deadband circuit 52 on line 58. The actuating relay 36a of switch 36 will be energized when the absolute magnitude of the output of summer 51 exceeds the predetermined deadband of circuit 52. That is, when the output of summer 51 exceeds a predetermined level $V_3$ in either the positive or the negative direction. The output of the deadband circuit 52 will be of magnitude $V_4$ which is sufficient to energize relay 36a. Switch 36 is connected to receive a channel selection signal from the manual channel select switch 50 or the trigger circuit 37 on lines 40 and 38, respectively. The switch 36 is operable to connect either line 40 or line 38 to the actuating relay 41a of switch 41 according to the output of the deadband circuit 52. Switch 41 connects the output of either channel A or B to the output channel 10 as previously described.

The switch 36 normally connects the output of the manual channel select switch 50 to the actuating relay of switch 41 whereby either channel A or channel B can be selected manually. When a fault in channel A or B of sufficient magnitude to exceed a deadband width of predetermined size is detected by the third comparing means, switch 36 connects the output of the trigger circuit 37 on line 38 to the actuating relay of switch 41. At that time the output of the channel select circuit 11 determines whether channel A or B will be connected to the output channel 10 in the manner previously described.

Figure 2:
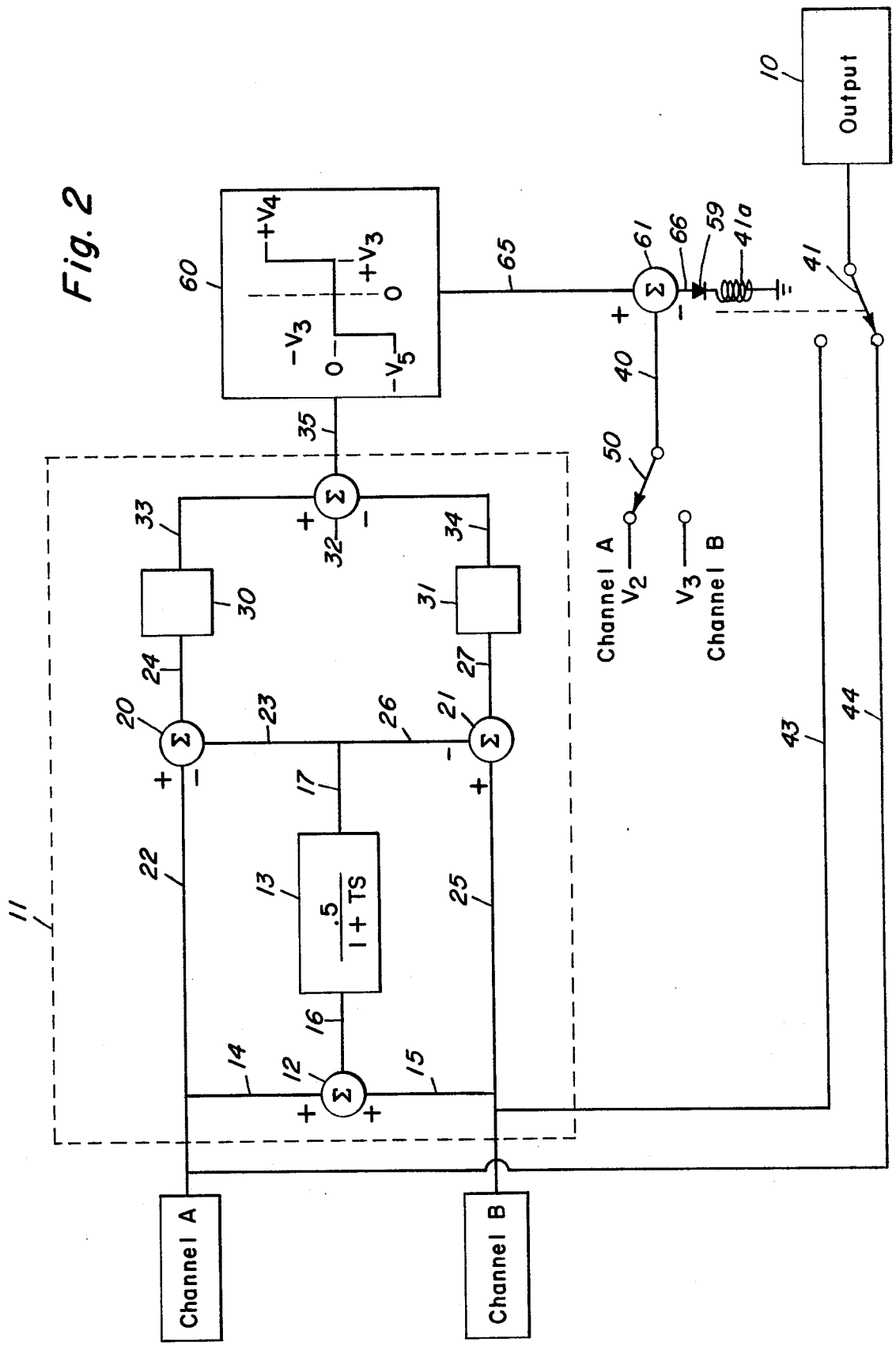
FIG. 2 is a schematic representation of a second embodiment of the invention.

A second embodiment of the invention is illustrated in FIG. 2. The embodiment of FIG. 2 shares many like components with that of FIG. 1 and like components are given the same numeral designation in both figures. Of principal importance the embodiment of FIG. 2 employs the same channel select circuit 11, manual channel select switch 50 and relay operated bistable switch 41. The embodiment of FIG. 2 differs from that of FIG. 1 principally in that the output of the channel select circuit 11 rather than the output of an independent trip circuit is employed to determine whether a fault has occurred. This is accomplished by providing a switching means which in this embodiment comprises a three-level switch 60, a sixth summer 61, diode 59 and relay-actuated bistable switch 41.

The three-level switch 60 is connected to receive the output of the channel select circuit 11 on line 35. The three-level switch 60 is operable to supply the following outputs:

1. An output of zero when the output of the channel select circuit 11 is within a predetermined range;

2. An output equal to a voltage $V_4$, positive in polarity, when the output of the channel select circuit 11 is more positive than the preset level $V_3$; or 3. An output equal to a voltage $V_5$, negative in polarity, when the output of channel select circuit 11 is more negative than the preset level $V_3$.

The voltage $V_4$ is selected so that when summed with $V_1$ or $V_2$ it will provide a voltage of sufficient magnitude to energize relay 41a. The voltage $V_5$ is selected so that when summed with $V_1$ it will cause relay 41a to be deenergized. The diode 59 prevents relay 41a from being energized when the sum of $V_5$ and $V_2$ is applied to it. The summer 61 is connected to receive the output of three-level switch 60 on line 65. The summer 61 provides an output on line 66 equal to the sum of the outputs of the manual channel select switch 50 and the three-level switch 60 on lines 40 and 65, respectively.

When the output of the channel select circuit 11 is within the predetermined range $\pm V_3$ (indicating that the outputs of channels A and B are identical and in the unfaulted condition) the output of the three-level switch 60 is zero and the output of the summer 61 is equal to $V_1$ or $V_2$ determined by the position of the manual channel select switch 50. The output of the manual channel select switch 50 determines the position of switch 41 and therefore determines which channel output is connected to the output channel of 10 in the manner previously described.

In the case where the output of the channel select circuit 11 is positive in polarity (indicating a fault in channel A) and of a predetermined magnitude, three-level switch 60 produces an output on line 65 equal to voltage $V_4$. If the manual channel select switch 50 is at that time in the channel A position the output of the channel select switch on line 40 will be a voltage $V_2$. The output of summer 61 on line 66, the sum of $V_1$ and $V_4$, will then be of sufficient magnitude to energize relay 41a causing switch 41 to change position and connect the input from channel B on line 43 to the output channel 10.

In the case where the channel select circuit 11 indicates a fault on channel A and the manual channel select switch 50 is already on channel B (that is, line 43 connected to output 10) the output of summer 61 is a voltage positive in polarity and of sufficient magnitude ($V_4 + V_1$) to keep relay 41a energized whereby switch 41 will not change position.

In the case where the output of the channel circuit 11 is negative in polarity (indicating a fault in channel B) the output of the three-level switch 60 on line 65 is the voltage $V_5$ negative in polarity. If at that time the manual channel select switch 50 is in the channel B position the output of the manual channel select switch 50 on line 40 will be a voltage $V_1$ positive in polarity. The output of summer 61 on line 66, the sum of $V_5$ and $V_1$, will cause relay 41a to be deenergized whereby the relay-operated switch 41 changes position thus connecting the output of channel A on line 44 to the output channel 10.

In the case where the channel select circuit 11 indicates a fault in channel B and the manual channel select switch is already on channel A the output of the summer 61 will be the sum of $V_5$ and $V_2$ negative in polarity and the position of relay-operated switch 41 will be unaffected. The diode 59 prevents the large negative output of summer 66 from energizing relay 41a.

Since the inputs from channels A and B are only separated from the output channel 10 by switches and the supervisory circuit is located outside of the main current path a fault in one of the supervised channels does not affect the output of the control system. The supervisory circuit of the present invention is capable of detecting faulted channels exhibiting both increases and decreases in output voltage. A two-channel control system employing the supervisory circuit of the present invention provides a reliability approaching that of a redundant three-channel control system without the cost of adding a third redundant channel.

Possible modifications of the supervisory circuit described in the preferred embodiments include the use of a high or low gate in the channel select circuit between the two input channels rather than an average of these channels. The delay function used in the channel select circuit could be generated by something other than a simple RC circuit; for example, a sample and hold circuit could also be used or, in digital circuits, the N digital values could be stored and the appropriate value selected from the N values. The fifth summer and the deadband circuit of the third comparing means of the first embodiment could be replaced by a comparator or other switching device. The relays used for switching could be replaced by FET switches or other types of solid state switches. If desired, the manual select feature of the first embodiment could be eliminated by removing switch 50, switch 36, the summer 51 and the deadband circuit 52. Monitor and test circuits could be easily added at various points in the supervisory circuits. These and other modifications of the invention will occur to those skilled in the art and it is intended to cover all such modifications that come within the meaning and range of equivalents of the appended claims.

We claim:

1. A supervisory circuit for a redundant two-channel control system which includes first and second input channels and an output channel, said supervisory circuit comprising:
   (a) first means for forming a time delayed average connected to receive an input from each of said first and second channels and providing an output equal to the average of the outputs of said input channels with a predetermined time delay;
   (b) first comparing means connected to receive an input from each of said channels and from said first means, said first comparing means providing a first output equal to the output of said first channel minus the output of said first means and a second output equal to the output of said second channel minus the output of said first means;
   (c) second comparing means connected to receive the first and second outputs of said first comparing means, said second comparing means providing an output representative of the difference between the absolute values of the first and second outputs of said first comparing means, the polarity of said output indicating which channel is faulted; and
(d) trigger means connected to receive the output of said second comparing means and providing an output dependent upon the polarity of the output from said second comparing means;
(e) first switching means connected to receive the output of said trigger means, and inputs from said first and second input channels, said first switching means being responsive to the output of said trigger means for selectively connecting either said first or said second input channel to said output channel.

2. The supervisory circuit of claim 1 wherein said first means comprises:
(a) first summing means connected to receive an input from each of said channels, said first summing means providing an output equal to the sum of the outputs from said channels; and
(b) time delay and averaging means connected to receive the output of said first summing means, said time delay and averaging means providing an output equal to one-half the output of said first summing means with a predetermined time delay.

3. The supervisory circuit of claim 1 wherein said first comparing means comprises:
(a) second summing means connected to receive the output of said first channel and the output of said first means, said second summing means providing the first output of said first comparing means; and
(b) third summing means connected to receive the output of said second input channel and the output of said first means, said third summing means providing the second output of said first comparing means.

4. The supervisory circuit of claim 1 wherein said second comparing means comprises:
(a) first and second means for determining absolute value connected to receive the first and second outputs respectively of said first comparing means and to provide first and second outputs equal to the absolute values of the first and second outputs respectively of said first comparing means; and
(b) fourth summing means connected to receive the outputs of said first and second means for determining absolute value, said fourth summing means providing an output equal to the output of said first means for determining absolute value minus the output of said second means for determining absolute value.

5. The supervisory circuit of claim 1 and further including:
(a) a manual channel select switch operable to selectively connect either of said input channels to said output channels; and
(b) third comparing means connected to receive an input from each of said input channels and operable to disable said manual channel select switch in favor of said trigger circuit in response to a difference between the inputs of said input channels which exceeds a predetermined level.

6. The supervisory circuit of claim 5 wherein said third comparing means comprises:
(a) fifth summing means connected to receive the outputs of each of said channels, said fifth summing means providing an output equal to the difference between the outputs of said channels;
(b) a deadband circuit connected to receive the output from said fifth summing means, said deadband circuit providing an output when the absolute magnitude of the output of said fifth summing means exceeds a predetermined level; and
(c) second switching means connected to receive the output of said deadband circuit and operable to disable said manual channel select switch.

7. The supervisory circuit of claim 6 wherein;
(a) said manual channel select switch is selectively connectable to sources of different magnitude;
(b) said second switching means is normally connected to said manual channel select switch but is connectable to said trigger circuit in response to an output from said third comparing means; and
(c) said first switching means includes a switch operable to selectively connect either of said input channels to said output channel according to the output of said trigger circuit.

8. The supervisory circuit of claim 1 further including:
(a) a manual channel select switch operable to selectively connect either of said input channels to said output channel; and
(b) wherein said first switching means comprises:
(i) a three-level switch connected to receive the output of said second comparing means, said three-level switch being operable to supply an output:
(1) equal to zero when the output of said second comparing means is within a predetermined range;
(2) equal to a second voltage positive in polarity when the output of said second comparing means is more positive than a preset level; or
(3) equal to a third voltage negative in polarity when the output of said second comparing means is more negative than a preset level; and
(ii) sixth summing means connected to receive outputs from said manual channel select switch and said three-level switch, said sixth summing means providing an output equal to the sum of the outputs of said manual channel select switch and said three-level switch; and
(iii) a switch operable to connect either of said input channels to said output channel depending on the output of said sixth summing means.

* * * * *